(12) United States Patent
Michel et al.

(10) Patent No.: US 7,401,058 B2
(45) Date of Patent: Jul. 15, 2008

(54) ARTIFICIAL NEURON WITH PHASE-ENCODED LOGIC

(75) Inventors: Howard E. Michel, Dartmouth, MA (US); David P. Rancour, Fall River, MA (US)

(73) Assignee: University of Massachusetts, Boston, MA (US)

( * ) Notice: Subject to any disclaimer, the term of this patent is extended or adjusted under 35 U.S.C. 154(b) by 318 days.

(21) Appl. No.: 11/118,087

(22) Filed: Apr. 29, 2005

(65) Prior Publication Data

US 2006/0004681 A1 Jan. 5, 2006

Related U.S. Application Data

(60) Provisional application No. 60/567,413, filed on Apr. 29, 2004.

(51) Int. Cl.
*G06F 15/18* (2006.01)
*G06N 3/08* (2006.01)

(52) U.S. Cl. ............................................. 706/25
(58) Field of Classification Search .................. 706/25
See application file for complete search history.

(56) References Cited

U.S. PATENT DOCUMENTS

| | | | |
|---|---|---|---|
| 4,027,175 A | 5/1977 | Hurst | |
| 5,355,435 A * | 10/1994 | DeYong et al. | 706/26 |
| 5,355,436 A | 10/1994 | Shin | |
| 5,535,309 A | 7/1996 | Shin | |
| 5,671,336 A * | 9/1997 | Yoshida et al. | 706/30 |
| 5,696,881 A | 12/1997 | Wang | |
| 5,781,701 A | 7/1998 | Wang | |
| 6,151,594 A | 11/2000 | Wang | |
| 6,269,351 B1 | 7/2001 | Black | |
| 6,394,952 B1 * | 5/2002 | Anderson et al. | 600/300 |
| 6,501,294 B2 | 12/2002 | Bernstein et al. | |
| 6,708,159 B2 | 3/2004 | Kadri | |
| 6,867,051 B1 * | 3/2005 | Anderson et al. | 436/518 |
| 6,936,476 B1 * | 8/2005 | Anderson et al. | 436/518 |
| 7,139,740 B2 * | 11/2006 | Ayala | 706/26 |
| 7,164,117 B2 * | 1/2007 | Breed et al. | 250/221 |
| 7,270,970 B2 * | 9/2007 | Anderson et al. | 435/7.94 |
| 7,370,019 B2 * | 5/2008 | Mattiussi et al. | 706/13 |

OTHER PUBLICATIONS

Conditioned response training of robots using Adaptrode-based neural networks Mobus, G.E.; Fisher, P.S.; Neural Networks, 1991., IJCNN-91-Seattle International Joint Conference on vol. ii, Jul. 8-14, 1991 pp. 1002 vol. 2 Digital Object Identifier 10. 1109/IJCNN.1991. 155678.*

(Continued)

*Primary Examiner*—Michael B Holmes
(74) *Attorney, Agent, or Firm*—Fish & Richardson P.C.

(57) ABSTRACT

An artificial neuron includes an aggregator that combines a plurality of input signals. The value state of each of the input signals is encoded in a phase thereof. The artificial neuron also includes an actuator in communication with the aggregator. The actuator is configured to provide an output signal having a value state encoded in a phase thereof. The value state of the output signal may be selected on the basis of the value states of the input signals. The value state of each of the input signals and/or the output signal may be a logical state.

41 Claims, 7 Drawing Sheets

OTHER PUBLICATIONS

New skill learning paradigm using various kinds of neurons Tae-Dok Eom; Sung-Woo Kim; Changkyu Choi; Ju-Jang Lee; Intelligent Robots and Systems '96, IROS 96, Proceedings of the 1996 IEEE/RSJ International Conference on vol. 3, Nov. 4-8, 1996 pp. 1157-1164 vol. 3 Digital Object Identifier 10.1109/IROS.1996.568965.*

Neural networks in computational science and engineering Cybenko, G.; Computational Science & Engineering, IEEE vol. 3, Issue 1, Spring 1996 pp. 36-42 Digital Object Indentifier 10.1109/99.486759.*

Optical method for generalized Hebbian-rule in optical neural network Tsumura, N.; Fujii, Y.; Itoh, K.; Ichioka, Y.; Neural Networks, 1993. IJCNN '93-Nagoya. Proceedings of 1993 International Joint Conference on vol. 1, Oct. 25-29, 1993 pp. 833-836 vol. 1 Digital Object Identifier 10.1109/IJCNN.1993.714042.*

Conditioned response training of robots using Adaptrode-based neural networks Mobus, G.E.; Fisher, P.S.; Neural Networks, 1991., IJCNN-91-Seattle International Joint Conference on vol. ii, Jul. 8-14, 1991 p. 1002 vol. 2 Digital Object Identifier 10.1109/IJCNN.1991.155678.*

Nitta, T., "An extension of the back-propagation algorithm to complex numbers," Neural Networks, 10 (8), 1391-1415, 1997.

Benvenuto, N., and Piazza, F., "On the complex backpropagation algorithm," IEEE Transactions on Signal Processing, 40 (4), 967-969, 1992.

Leung, H., and Haykin, S., "The complex backpropagation algorithm," IEEE Transactions on Signal Processing, 39 (9), 2101-2104, 1991.

Georgiou, G. M., and Koutsougeras, C., "Complex domain backpropagation," IEEE Transactions on Circuits and Systems—II: Analog and Digital Signal Processing, 39 (5), 330-334, 1992.

Smith, M. R., and Hui, Y., "A data extrapolation algorithm using a complex domain neural network," IEEE Transactions on Circuits and Systems—II: Analog and Digital Signal Processing, 44(2), 143-147, 1997.

Arena, P, Fortuna, G., Muscato, G., and Xibilia, M. G., "Multilayer Perceptrons to approximate quaternion valued functions," Neural Networks, 10 (2), 335-342, 1997.

Hirose, A., "Dynamics of fully complex-valued neural networks," Electronics Letters, 28 (16), 1492-1494, 1992.

Casasent, D., and Natarajan, S., "A classifier neural network with complex-valued weights and square-law nonlinearities," Neural Networks, 8 (6), 989-998, 1995.

Weber, D. M. and Casasent, D. P., "The extended piecewise quadratic neural network," Neural Networks, 11, 837-850, 1998.

Hirose, A., "Applications of complex-valued neural networks to coherent optical computing using phase-sensitive detection scheme," Information Sciences, 2, 103-117, 1994.

Awwal, A. A. S. and Power G., "Object Tracking by an Opto-electronic Inner Product Complex Neural Network," Optical Engineering, 32, 2782-2787, 1993.

Michel, H, E, and Awwal, A. A. S., "How to Train a Phase Only Filter", in Advances in Optical Information Processing IX, Dennis R. Pape, Editor, Proceedings of SPIE vol. 4046, 2000.

Awwal, A. A. S., and Michel, H. E., "Enhancing the discrimination capability of phase only filter," Asian Journal of Physics, vol. 8, No. 9, 2000.

Aizenberg, N. N., and Aizenberg, I. N., "Universal binary and multi-valued paradigm: Conception, learning, applications," Lecture Notes in Computer Science, 1240, 463-472, 1997.

Igelnik, B., Tabib-Azar, M., and LeClair, S., "A net with Complex Weights," IEEE Transactions on Neural Networks, 12(2), pp. 236-249, 2001.

Michel, H. E., and Kunjithapatham, S., "Processing Landsat TM data using complex-valued neural networks," in Data Mining and Knowledge Discovery: Theory, Tools and Technology IV, Belur V. Dasarathy, Editor, Proceedings of SPIE (to be published) 2002.

Beiu, V., Quintana, J.M., Avedillo, M.J., "VLSI Implementations of Threshold Logic□A Comprehensive Survey", IEEE Transactions on Neural Networks, 14(5).

Michel, H. E., Rancour, D., Iringentavida, S., "CMOS Implementation of Phase-Encoded Complex-Valued Artificial Neural Networks," The 2004 International Conference on VLSI, Jun. 21-24, 2004.

Jain et al. "Artificial Neural Networks: A tutorial". Computer, pp. 31-44, Mar. 1996.

Hopfield. "Pattern recognition computation using action potential timing for stimulus representation". Nature 376:33-36, Jul. 1995.

Maass. "Lower Bounds for the Computational Power of Networks of Spiking Neurons". Neural Computation 8:1-4, 1996.

McCulloch et al. "A logical calculus of the ideas immanent in nervous activity". Bulletin of Mathematical Biophysics, 5:115-133, 1943.

Khan et al. "A parallel, distributed and associative approach for searching image patterns with holographic dynamics". Journal of Visual Languages and Computing 8:303-331, 1997.

Elias et al. "Switched-Capacitor Neuromorphs with Wide-Range Variable Dynamics". IEEE Transactions on Neural Networks 6(6):1542-1548, Nov. 1995.

Bayro-Corrochano. "Geometric Neural Computing". IEEE Transactions on Neural Networks 12(5):968-986, Sep. 2001.

Pal et al. "Neurocomputing: Motivation, Models and Hybridization". Computer, pp. 24-28, 1996.

Mortara et al. "A Communication Scheme for Analog VLSI Perceptive Systems". IEEE Journal of Solid-State Circuits 30(6):660-669, Jun. 1995.

Khan. "Characteristics of Multidimensional Holographic Associative Memory in Retrieval with Dynamically Localized Attention". IEEE Transactions on Neural Networks 9(3):389-406, May 1998.

* cited by examiner

ARTIFICIAL NEURON WITH PHASE-ENCODED LOGIC

CROSS-REFERENCE TO RELATED APPLICATION

This application claims priority under 35 USC § 119(e) to U.S. patent application Ser. No. 60/567,413, filed on Apr. 29, 2004, the entire content of which is hereby incorporated by reference.

FIELD OF INVENTION

The invention relates to neurons and to neural networks.

BACKGROUND

A neural chip is an analog or digital integrated circuit that implements several processing elements, which are often referred to as "neurons." These neurons are independent and operate in parallel. Such neural chips are often used as building blocks, for assembling larger networks.

SUMMARY

The invention provides an analog Very Large-Scale Integration (VLSI) implementation of a simple neuron using phase encoded inputs and complex valued weights. The proposed neuron uses high frequency AC signals as inputs and phase shifted bias signals as weights to the neuron. The neuron can be programmed to implement all 16 functions of two Boolean variables and 245 of the 256 functions of three Boolean variables without additional logic, neuron stages, and higher order terms. The single neuron devised can be used to create a network of neurons. Non-Boolean functions may also be implemented.

In one aspect, the invention includes an artificial neuron for implementing functions, such as, for example, a logic gate, in an artificial neural network. The neuron may include an aggregator that combines a plurality of input signals. The value state of each of the input signals may be encoded in a phase thereof. The neuron may also include an actuator in communication with the aggregator. The actuator may be configured to provide an output signal having a value state encoded in a phase thereof. The value state of the output signal may be selected on the basis of the value states of the input signals.

In certain embodiments the aggregator may include a plurality of delay elements. Each of the plurality of delay elements may apply a corresponding phase delay to one of the plurality of input signals. Other embodiments may also include a bias input for receiving a bias signal and a bias input delay element in communication with the bias input that applies a bias phase delay to the bias signal.

In other embodiments, the aggregator may further include a summer that adds together the plurality of input signals, and, in some cases, the bias signal.

In other embodiments the actuator may include a threshold detector configured to provide a detector output indicating whether a sum of the input signals exceeds a threshold, and a multiplexer that selects, on the basis of the detector output, an output signal of the neuron from among a plurality of mutually phase-shifted signals.

In other embodiments the value state of each of the input signals may be a logical state, and the value state of the output signal may also be a logical state.

The invention also includes circuits for implementing any of the foregoing artificial neurons. In certain embodiments the circuits may be CMOS circuits.

In certain embodiments of such circuits, the plurality of input signals may include a first and second input, and the aggregator may include a differential amplifier that receives the first and second inputs and provides a difference thereof.

In other embodiments of such circuits, the actuator may include a rectifier that receives a difference signal from the differential amplifier, and a Schmitt trigger having an output state controlled by an output of the rectifier.

In some embodiments of such circuits, the aggregator may include a summation circuit that receives the plurality of input signals and provides an output current corresponding to the sum of the respective currents produced by the plurality of input signals. In other embodiments, the actuator may include a rectifier that rectifies the output received from the summation circuit, a DC-level shifter that shifts the DC component of the signal rectified by the rectifier, and an inverter chain that determines if the rectified and DC-shifted signal exceeds a threshold value associated with the inverter chain.

In some embodiments the rectifier may be a half-wave rectifier or a full-wave rectifier.

In another aspect, the invention includes an artificial neuron that may include an aggregator that combines a plurality of continuous input signals. The value state of each of the input signals may be encoded in at least one of the phase, amplitude, and/or frequency of the corresponding input signal. The neuron may also include an actuator in communication with the aggregator. The actuator may be configured to provide a continuous output signal. The value state of the output signal may be encoded in at least one of the phase, amplitude, and/or frequency of the output signal. The value state of the output signal may be selected on the basis of the value states of the input signals.

In another aspect, the invention includes a method for processing data using an artificial neuron. The method includes receiving, at the artificial neuron, a plurality of input signals. The value state of each of the input signals may be encoded in a phase thereof. The method also includes combining the plurality of input signals, and providing a neuron output signal. The value state of the output signal may be encoded in a phase thereof. The value state of the neuron output signal may be selected on the basis of the value states of the input signals.

In another aspect, the invention includes a system that may include a plurality of interconnected artificial neurons. Each of the artificial neurons may include an aggregator that combines a plurality of continuous input signals. The value state of each of the input signals may be encoded in a phase thereof. The system may also include an actuator in communication with the aggregator, the actuator configured to provide a continuous output signal. The value state of the output signal may be encoded in a phase thereof, and it may be selected on the basis of the value states of the input signals.

In yet another aspect, the invention includes a method of manufacturing artificial neurons that includes forming, for each artificial neuron, an aggregator that combines a plurality of continuous input signals. The value state of each of the input signals may be encoded in a phase thereof. The manufactured artificial neuron may also include an actuator in communication with the aggregator, the actuator being configured to provide a continuous output signal. The value state of the output signal may be encoded in a phase thereof. The value state of the output signal may be selected on the basis of the value states of the input signals.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DETAILED DESCRIPTION

Figure 1:
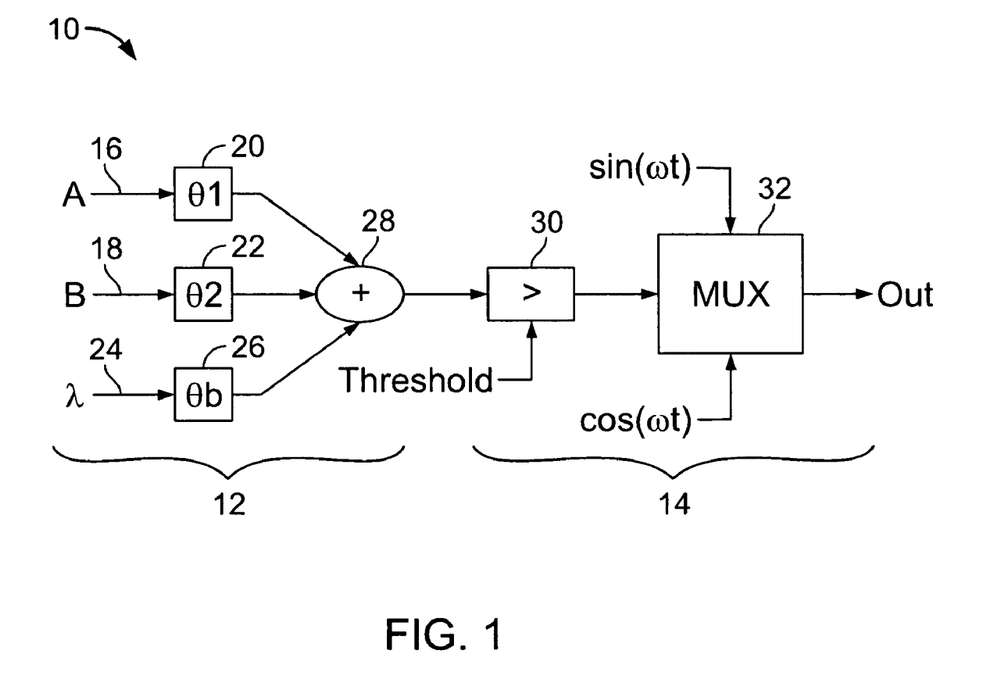
FIG. 1 is a block diagram of an artificial neuron.

A complex-valued neuron 10, shown in FIG. 1, includes an aggregator portion 12 for receiving and combining input signals and an activating portion 14 for determining a logical output on the basis of the input signals. The input and output signals are continuous valued signals, such as sines or cosines. Continuous signals may also include other periodic signals having a phase and frequency, and/or signals having a defined signal level for a finite time interval.

The logic state of either an input or an output signal may be encoded in the phase of the signal. For example, in a two-state logical system, a logical "zero" can be represented by a cosine wave, and a logical "one" can be represented by applying a ninety degree phase shift, thereby forming a sine wave. Multistate value systems can be implemented by encoding the additional value states as different phase angles.

In the embodiment of FIG. 1, the aggregator portion 12 includes first and second analog inputs 16, 18 in communication with respective first and second phase delays. A third analog input 24 receives a bias signal, which is provided to a bias delay. These delays 20, 22, 26 apply phase shifts to their respective input signals. The phase-shifted input signals and the phase shifted bias signal are then added together at a summer 28.

The activating portion 14 includes a comparator 30 configured to control a selection made by a multiplexer 32. The comparator 30 compares the output of the summer 28 with a threshold value. The output of the comparator 30, which may be a DC voltage level, is fed to a selector input of the multiplexer 32 to control which of two, or more, candidate signals supplied to the multiplexer 32 will be passed to an output thereof.

In the illustrated embodiment, the candidate signals are sinusoids in phase quadrature, each one of which corresponds to a logic state. However, any signal having a well-defined phase can be used. For example, the candidate signals can also be square waves or pulse trains in phase quadrature.

The illustrated neuron 10 can be programmed to implement any one of the Boolean logic gates by suitably selecting values for the three phase shifts 20, 22, 26. For example, to implement an AND gate, one would set the first and second phase shifts to 180 degrees. The bias phase shift would be zero degrees, and the amplitude of the bias signal would be unity.

In the case of an XOR gate, the amplitude of the bias element is zero and the first and second phase shifts are 0 degrees and 180 degrees respectively. Therefore, the summation of the input signals amounts to a subtraction. As a result, no explicit phase-shifting circuitry is required.

Figure 2:
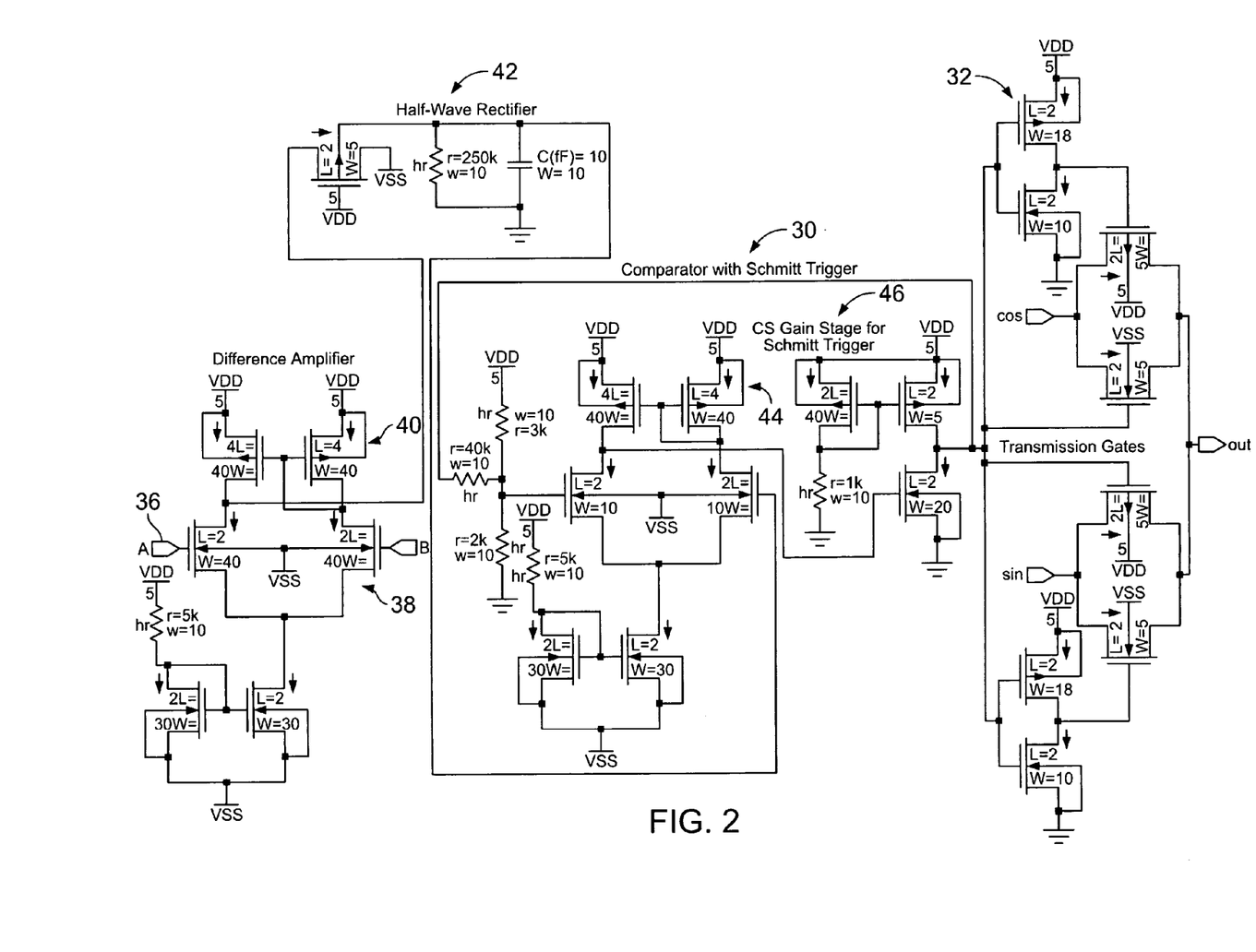
FIG. 2 is a circuit for implementing the XOR function.

Referring to FIG. 2, an exemplary CMOS circuit for carrying out the XOR gate includes first and second inputs 36, 38. As noted above, there is no need for a third input because the amplitude of the bias signal is zero. The first and second inputs 36, 38 are provided to a difference amplifier 40, which outputs their difference. In the illustrated embodiment, the input signals are 100 mV signals having a frequency of 1 GHz. However, other signal amplitudes and frequencies can be used.

This difference, which is still an AC signal, is rectified at a half-wave rectifier 42, the output of which is a DC voltage. It will be understood that other types of rectifiers, including a full-wave rectifier, may be used instead. A second difference amplifier 44 serves as the first stage of the comparator 30. This is followed by a common source gain stage 46. The output of the common source gain stage 46 is fed back to the non-inverting input of the comparator 30, thereby realizing a Schmitt trigger for faster switching. The output of the comparator 30 drives a multiplexer 32 made up of CMOS transmission gates that select and pass either sin(ωt) (logic 1) or cos(ωt) (logic 0) to the next complex-valued neuron in the neural network.

Figure 3:
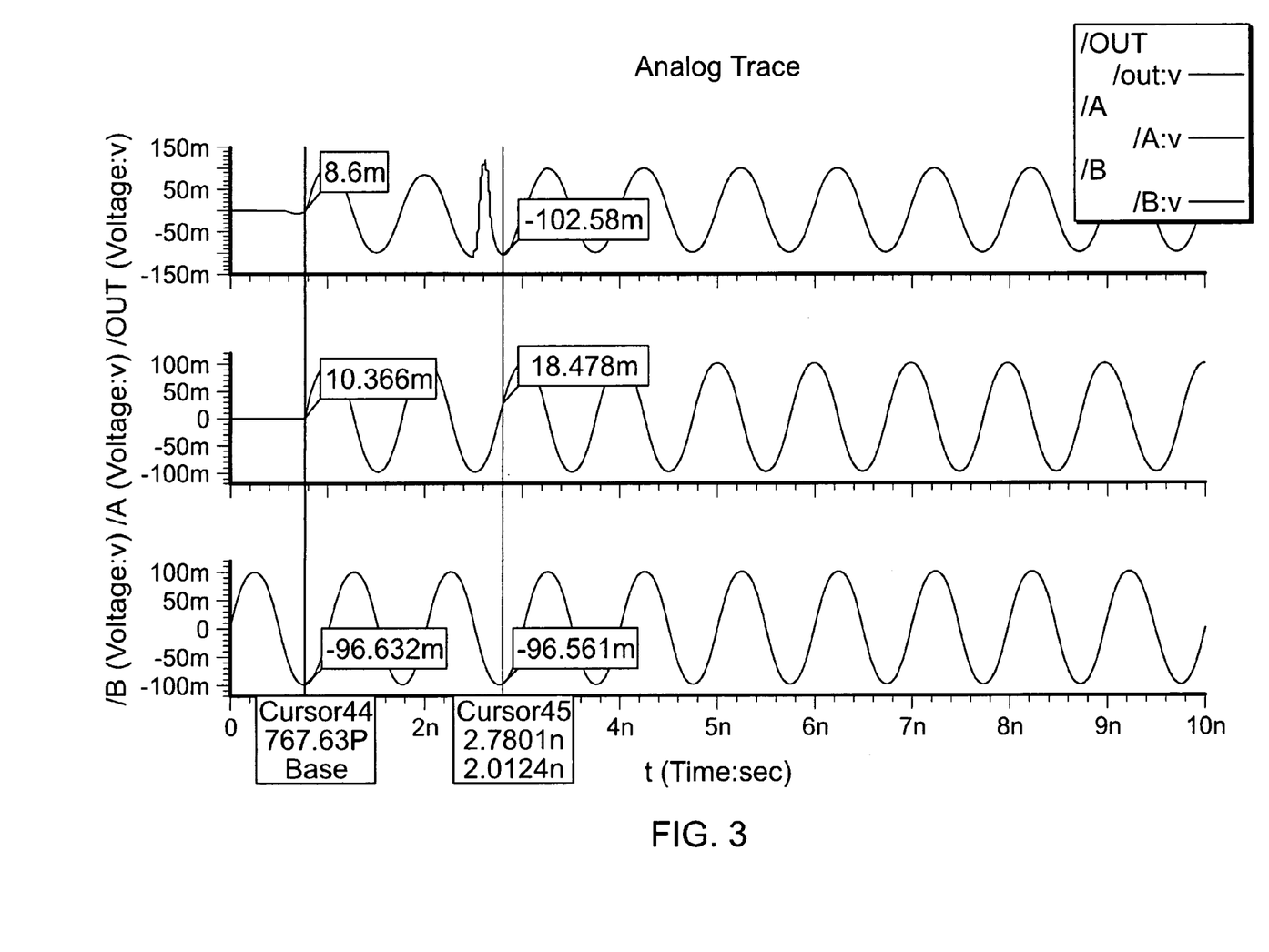
FIG. 3 is a graph of waveforms associated with the neuron of FIG. 2.

FIG. 3 shows simulated input and output waveforms for the circuit of FIG. 2. The default AC waveform is sin(ωt). The cos(ωt) waveform is obtained by adding a 0.75 nanosecond delay to sin(ωt). The lower trace shows the 100 mV 1 GHz sin(ωt) signal at the second input B. This signal is present for t≧0. The middle trace displays the 100 mV 1 GHz cos(ωt) signal at the first input A; this signal is present for t≧0.75 ns. The top trace shows the multiplexer output signal. The multiplexer 32 selects either sin(ωt) or cos(ωt) in response to the output of the comparator 30.

The comparator drives the multiplexer 30 to select sin(ωt) (logic 1) only if the A and B inputs are a sine and a cosine (1,0) or a cosine and a sine (0, 1); otherwise the multiplexer 32 selects cos(ωt). Consequently, the top trace is flat for the first 0.75 nanoseconds because cos(ωt) is selected but it does not turn on until t=0.75 ns. Input A also turns on at t=0.75 nanoseconds thereby producing the input condition {cos, sin} (0, 1). The output responds by changing from cos(ωt) (logic 0) to sin(cot) (logic 1) in about 2 nanoseconds. The PMOS and NMOS transistors are all biased in their active (saturation) regions and therefore consume DC power. Static power consumption is under 100 mW.

Figure 4:
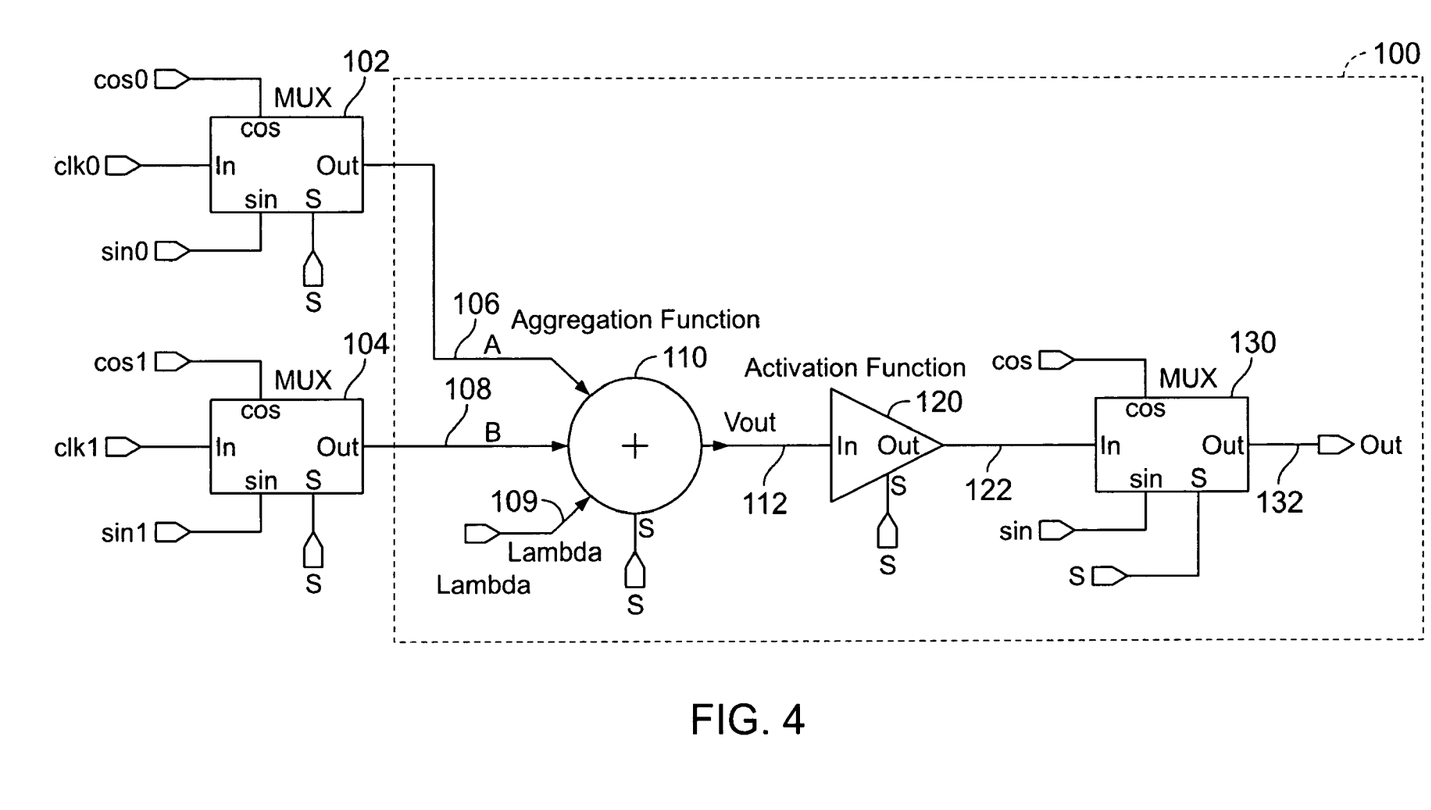
FIG. 4 is a block diagram of an artificial neuron capable of performing arbitrary functions.

FIG. 4 shows a block diagram of a complex-valued neuron 100 capable of realizing arbitrary functions (Boolean and non-Boolean). As shown, the neuron 100 receives, as input signals 106 and 108, the outputs of multiplexers 102 and 104 respectively. These multiplexers 102, 104 are associated with two other neurons (not shown in the figure) to which the neuron 100 is interconnected in a neural net. The neurons having outputs 106 and 108 may in turn be connected to receive inputs from and provide outputs to other neurons forming part of the neural net. The neuron 100 may similarly be connected to another neuron(s).

The representative neuron 100 includes an aggregation function module 110 that sums the input signals 106 and 108 with a bias signal 109. As will become apparent below, the bias signal 109 adjusts the signal level of the aggregation function module's output and thus enables control of the particular threshold level associated with the activation function module 110. The bias signal 109 may also enable realization of various functions. Although not shown, the signals 106 and 108 may be interconnected to respective phase delay elements that apply a phase shift to the signals. The type of phase shift, if any, to be performed on the signals 106 and 108 may depend on the particular two-input function that is to be realized by the neuron 100 shown in FIG. 5 and/or its CMOS circuit implementation. For example, to implement an XOR function, the input signal 108 may be connected to a phase delay element that shifts its phase by 180 degrees. This phase shift negates the value of the input signal 108, thus resulting in the implementation of a subtraction operation of the input signals 106 and 108, as is required for the realization of an XOR function.

Although the neuron 100 is shown as receiving two inputs, it will be understood that the neuron 100 may receive additional inputs. Further, the input received may correspond to different value states and not just to logical states. For example, the inputs received and processed by the neuron 100 may include inputs corresponding to integers in the range of 0-255. The input value in such a range could be represented, for example, by continuous signals, such as sinusoidal wave signals, having phases indicative of their values. Each value state may be represented, under these circumstances, by phases that are 0.3516 (i.e., 90 degrees/256) degrees apart from the phases of neighboring value states. Alternatively and/or additionally, representing a particular input/output value state using a continuous signal may be achieved by using different signal frequencies that would be indicative of such values, or by using other signal characteristics (e.g., amplitude). As provided herein, functions realized using neuron 100 may include non-Boolean functions. For example, neuron 100 may receive multiple input signals representative of value states that may be integers in the range 0-255. Such input may correspond to pixels from two different images. The function realized by the neuron 100 may then be, for example, a comparator to determine whether the two images (or portions of the two images) are the same or similar. In this example, the neuron 100 may then produce an output indicative of the degree of similarity between the two images. The neuron 100 may thus be used, for example, to perform face recognition.

The output 112 of the aggregation function module 110 represents the sum of the input signals 106 and 108, and the bias signal 109. This output is presented to the activation function module 120 which determines if this output 112 exceeds a set threshold. Depending on the results of that comparison, the activation function module 120 produces an output 122 indicative of the result of the comparison. For example, a +5V DC voltage level may be produced to indicate that output 112 exceeded the set threshold. The output 122 of the activation function module 120 is then presented to a multiplexer 130 which uses the activation function module output 122 to select, for example, an analog signal representative of the output 132 of the neuron 100.

Figure 5A:
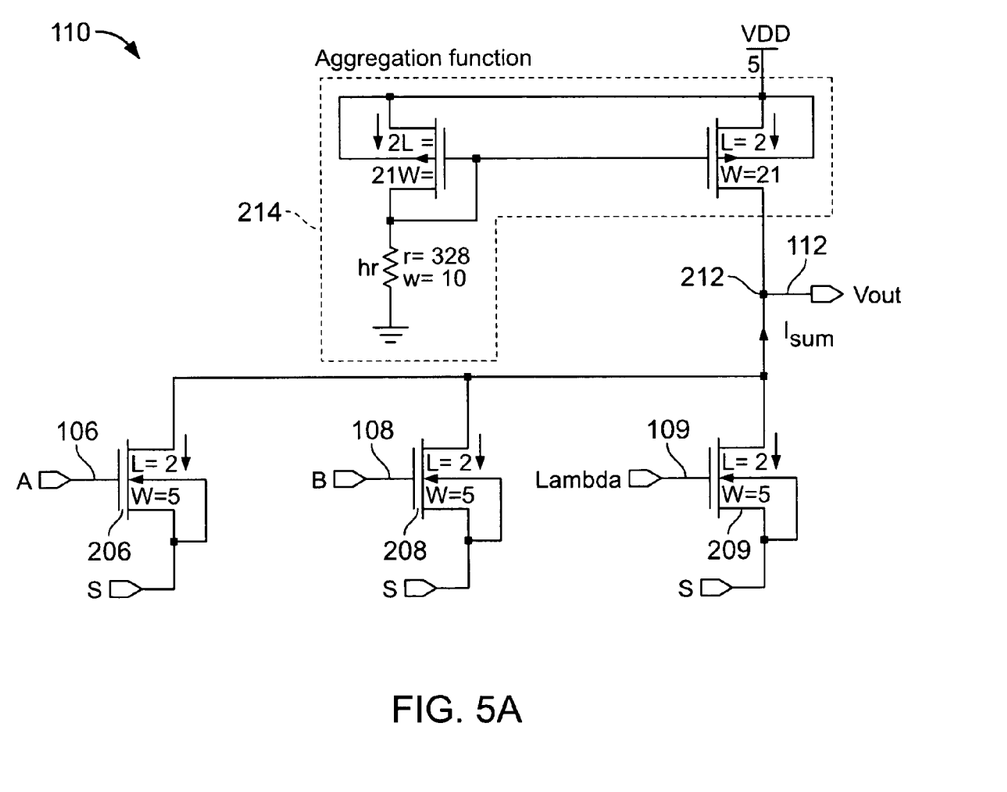
FIGS. 5A-5C are schematics of portions of a circuit for implementing the neuron shown in the block diagram of FIG. 4.
Figure 5B:
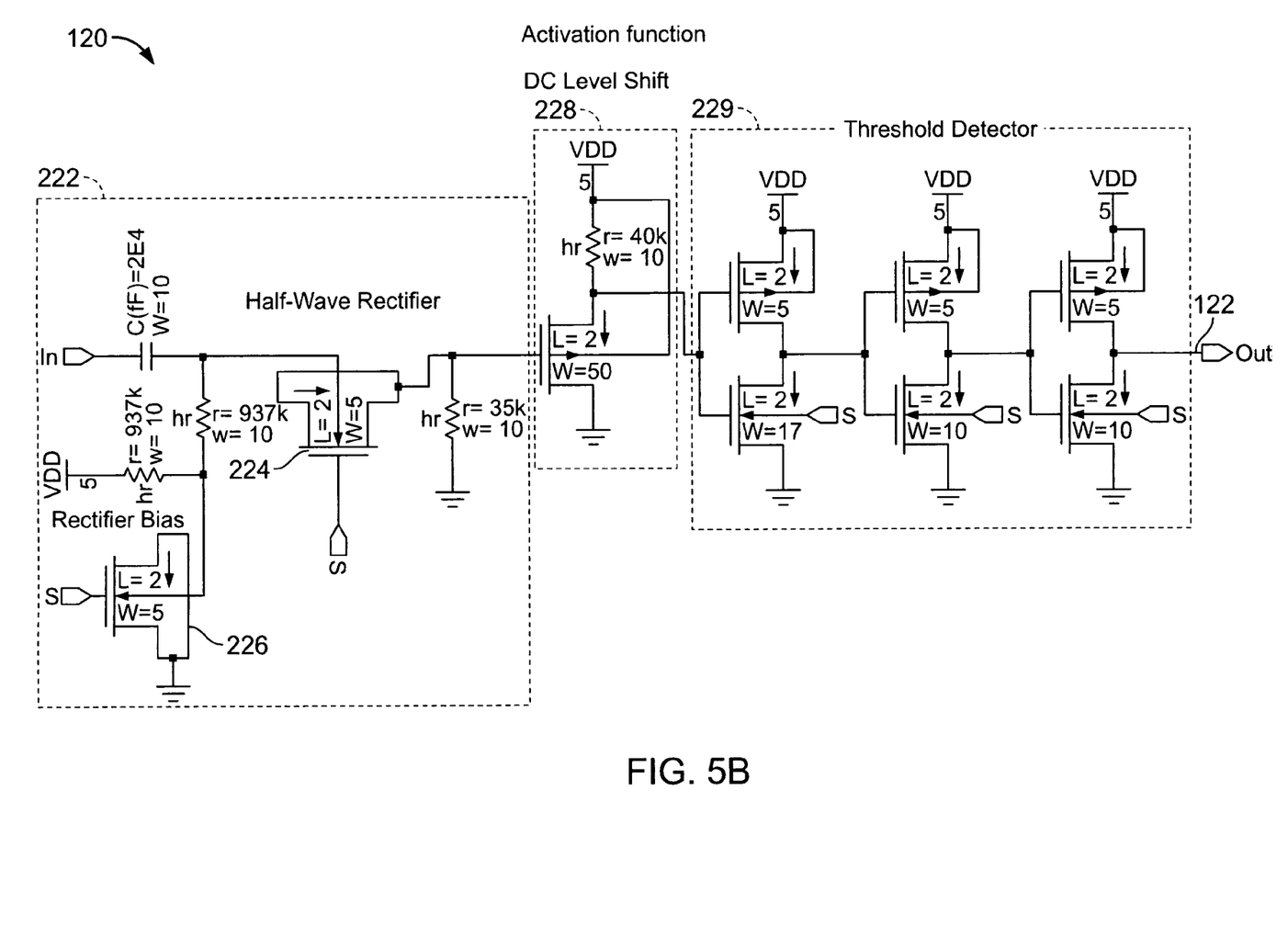
Figure 5C:
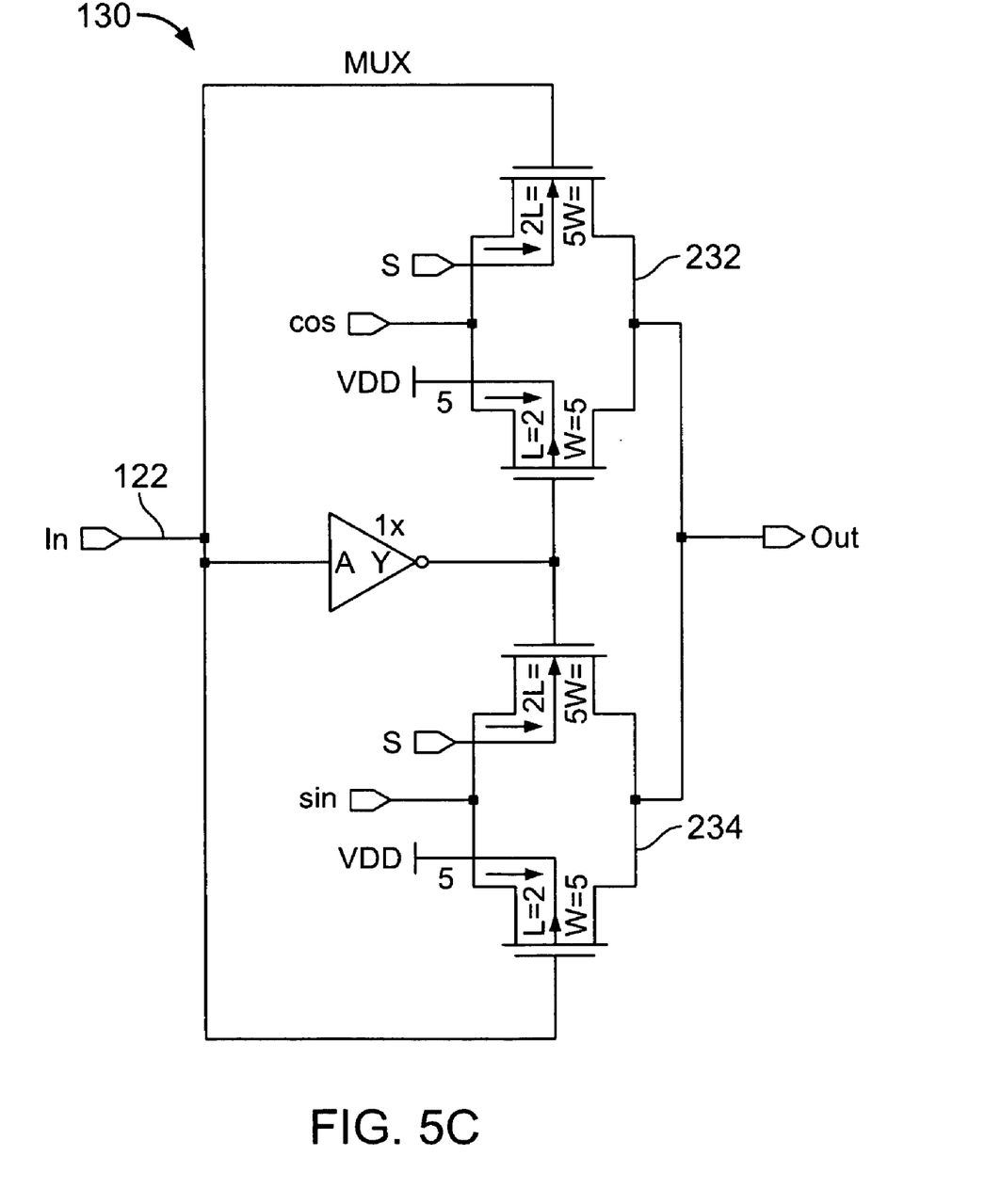

FIGS. 5A-5C show an embodiment of a CMOS circuit of the neuron 100 shown in FIG. 4. FIG. 5A shows a CMOS implementation of the aggregation function module 110. The input signals 106 and 108, which, as explained herein may be high frequency signals representative of logical states 1 or 0, are connected to the gates of respective first and second FET transistors 206 and 208. As previously noted, the signals 106 and 108 may be interconnected to phase delay elements so as to facilitate the implementation of logical functions, such as, for example, AND, XOR, and other logical operations. A bias signal 109, connected to the gate of a third FET transistor 209, may be used, for example, to control the threshold value at which decisions regarding the sum of the input signals 106, 108 will take place. Thus, the value of the bias signal 109 could be adjusted to a high value such that the sum of the input signals 106, 108 will more easily surpass the threshold value established by the activation function module. For example, if the activation function module 120 is set to detect signal sums exceeding a level of 5V, increasing the value of the bias signal 109 will make it easier to surpass that threshold value. As provided herein, the bias signal 109 may also be used in the realization of logical operations such as, for example, an AND operation.

As also provided herein, neuron 100 may be used to process the input signals to realize other types of functions, and may receive input signals that are representative of different values and value ranges. For example, the neuron 100 may receive several input signals corresponding to integer values in the range of 0-255. Such values may be, for example, represented by the phase of a sinusoidal signal of a particular frequency.

Additionally, as noted, the received signals may have been phase shifted by delay elements (not shown), thereby effecting a weighting of the received values. The aggregation function module 110 may then sum the signals (representing the weighted values) and, as will become apparent below, forward the signal (representative of the generated output of the aggregation function module) to the activation function module 120 for further processing.

As further seen in FIG. 5A, the drains of transistors 206, 208, and 209 are interconnected to a common line, and thus the current presented at junction 212 is the sum of the currents produced by the input signals 106, 108 and the bias signal 109. The circuit arrangement 214 shown in the upper part of FIG. 5A forms an active load for the sum of the currents aggregated by aggregation function module 110 (shown in FIG. 5A as $I_{sum}$), and thus the output voltage 112 will be equal to $I_{sum} \times R_{load}$, where $R_{load}$ is the resistance of an active load.

FIG. 5B shows the CMOS implementation of the activation function module 120.

As can be seen, the activation function module 120 includes a half-wave rectifier 222 that eliminates the negative portion of the signal sum produced as the output of the aggregation function module 110. It will be understood that other types of rectifiers, including a full-wave rectifier, may be used instead. The half-wave rectifier 222 is implemented using two FET transistors 224, 226, in which the drain and source are connected to each other, thereby enabling the transistor-pair to act like a diode. The resulting rectified signal is then forwarded to a DC-level-shift circuit 228 which increases the DC amplitude of the rectified signal. The rectified signal, with the added DC component, is then presented to the threshold detector circuit 229, implemented as an inverter chain. The threshold detector module 229 may produce an output signal 122 indicative of the result of the threshold detection. For example, the threshold detector module 229 may produce a DC output of +5V in response to a signal that exceeds the threshold value associated with the threshold detector module 229. The threshold detector 229 may also generate outputs from a set of multi-state values, thereby enabling the selection of one of a plurality of output signals controlled by the multiplexer 130.

FIG. 5C shows the CMOS implementation of the multiplexer 130. The multiplexer comprises first and second transmission gates 232 and 234, each implemented as an nFET transistor (i.e., an n-channel FET transistor) connected at its drain and source to the respective drain and source of a pFET transistor. An inverter, connected to the pFET transistor of the first transmission gate 232 and to the nFET transistor of the second transmission gate 234, inverts the voltage level of the input signal 122. Thus, when, for example, the input signal 122 has a positive DC voltage level (indicative, for example, that the threshold value associated with the threshold detector module 229 had been crossed) the electrical connections of the nFET and pFET of the first transmission gate 232 become closed, and the desired output signal, for example the cosine signal shown in FIG. 5C, is placed on the output of the multiplexer. On the other hand, that same voltage level of the input signal 122 will cause the electrical connections of the second transmission gate 234 to be opened, and therefore the output signal associated with the second transmission gate 234 will not be placed on the output of the multiplexer. The multiplexer 130 may also control the selection of additional output signals supplied to the multiplexer.

The CMOS implementation of this embodiment as shown in FIGS. 5A-5C enables the realization of arbitrary logical functions. Particularly, by appropriate application of a phase delay to the input signals 106 and 108, and by appropriate choice of the phase and amplitude of the bias signal 109, arbitrary logical functions may be realized. For example, and as explained above, to realize an XOR function, a phase shift of 180 degrees may be applied to the second input signal so as to negate its value, and thereby perform a subtraction operation using the aggregation function circuit of FIG. 5A. In this realization of an XOR operation, the bias signal 109 may be de-activated (by, for example, setting its amplitude to 0). Other realizations of various functions, including non-Boolean functions, may be achieved by appropriate choices of, for example, the phase shifts (if any) to be applied to the input signals of the neuron 100, and/or appropriate choice to the type of signal, phase (if any), and/or amplitude of the bias signal 109. Controlling other characteristics of the input signals to the neuron 100, including, for example, the frequency and/or amplitude of the input signals, may also be used to enable the realization of various arbitrary functions using neurons such as neuron 100.

In addition to its versatility in realizing arbitrary functions of multiple inputs, the circuit of FIGS. 5A-5C is also economical in terms of its transistor use and surface area requirements. In particular, for a two-input function implementation, the aggregation function circuit of FIG. 5A requires five (5) FET transistors, while the aggregation function circuit of FIG. 2, for example, requires six (6) transistors. The activation function circuit of FIG. 5B requires nine (9) FET transistors, while ten (10) transistors are needed to implement the activation function circuit of FIG. 2. The multiplexer circuit, shown in FIG. 5C, requires six (6) FET transistors to implement its two transmission gates and inverter, whereas eight (8) transistors are required to implement the two transmission gates and two inverters shown in FIG. 2. In all, the circuit of FIGS. 5A-5C requires 64% less surface area for its implementation than the circuit shown in FIG. 2.

As noted, the artificial neuron described herein may be connected in a neural network configuration. As is understood by those of ordinary skill in the art, a neural net can handle information in a parallel and/or distributed manner. The interconnected neurons may be interlinked through weighted interconnections, sometimes referred to as synapses, thereby enabling the formation of the interconnected architecture. Each synapse may scale the signal supplied by a neuron acting as a source and transfer the scaled or weighted signal to a further neuron that may act as a destination. As described herein, each neuron may receive a plurality of weighted input signals either via the synapses from other neurons or from a neural net input. Weighting of input and/or output signals may, as described herein, be performed using delay elements to phase shift the signals received or generated by individual neurons.

As is understood, neural net operation does not require a pre-specified algorithm to perform a given task. Instead, a neural net may adaptively handle data while learning from examples. Processing in a neural net may thus be achieved in a collective manner.

The simple, simultaneous operation of individual neurons and the distribution of signals throughout the neural net may result in the sophisticated functioning of the neural net as a whole. This kind of organization enables a plurality of neurons to collectively and simultaneously influence the state of an individual neuron according to the application of simple rules. For example, in a "feed-forward" configuration, the neurons are arranged in successive layers. In this configuration, a neuron of a particular layer supplies its output signal to a neuron in the next layer. The processing capacity acquired through learning is encoded in the synapses rather than in individual memory elements. As is understood, a neural net is typically suitable for handling optimization problems, carrying out pattern recognition, and performing classification tasks.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. An artificial neuron comprising:
   an aggregator that combines a plurality of input signals, the value state of each of the input signals being encoded in a phase thereof; and
   an actuator in communication with the aggregator, the actuator configured to provide an output signal, the value state of the output signal encoded in a phase thereof, the value state of the output signal being selected on the basis of the value states of the input signals.

2. The neuron of claim 1, wherein the aggregator comprises a plurality of delay elements, wherein each of plurality of delay elements applies a corresponding phase delay to one of the plurality of input signals.

3. The neuron of claim 2, further comprising:
   a bias input that receives a bias signal;
   a bias input delay element in communication with the bias input that applies a bias phase delay to the bias signal.

4. The neuron of claim 2, wherein the aggregator further comprises a summer that adds the plurality of input signals.

5. The neuron of claim 3, wherein the aggregator further comprises a summer that adds the plurality of input signals, and the bias signal.

6. The neuron of claim 1, wherein the actuator comprises:
   a threshold detector configured to provide a detector output, the detector output indicating whether a sum of the plurality of input signals exceeds a threshold, and a multiplexer that selects, on the basis of the detector output, an output signal from among a plurality of mutually phase-shifted signals.

7. The neuron of claim 1, wherein the value state of each of the input signals is a logical state, and wherein the value state of the output signal is a logical state.

8. A circuit for implementing the neuron of claim 1.

9. The circuit of claim 8, wherein the circuit is a CMOS circuit.

10. The circuit of claim 8, wherein the plurality of input signals includes a first and second input, and wherein the aggregator comprises a differential amplifier that receives the first and second inputs and provides a difference thereof.

11. The circuit of claim 10, wherein the actuator comprises:
a rectifier that receives a difference signal from the differential amplifier, and
a Schmitt trigger having an output state controlled by an output of the rectifier.

12. The circuit of claim 8, wherein the aggregator comprises a summation circuit that receives the plurality of input signals and provides an output current corresponding to the sum of the respective currents produced by the plurality of input signals.

13. The circuit of claim 12, wherein the actuator comprises:
a rectifier that rectifies the output received from the summation circuit,
a DC-level shifter that shifts the DC component of the signal rectified by the rectifier, and
an inverter chain that determines if the rectified and DC-shifted signal exceeds a threshold value associated with the inverter chain.

14. The circuit of claim 11, wherein the rectifier includes at least one of: a full-wave rectifier, and a half-wave rectifier.

15. An artificial neuron comprising:
an aggregator that combines a plurality of continuous input signals, the value state of each of the input signals being encoded in at least one of: a phase of the corresponding input signal, an amplitude of the corresponding input signal, and a frequency of the corresponding input signal; and
an actuator in communication with the aggregator, the actuator configured to provide a continuous output signal, the value state of the output signal encoded in at least one of: a phase of the output signal, an amplitude of the output signal, and a frequency of the output signal, the value state of the output signal being selected on the basis of the value states of the input signals.

16. The neuron of claim 15, wherein the aggregator comprises a plurality of delay elements, wherein each of plurality of delay elements applies a corresponding phase delay to one of the input signals.

17. The neuron of claim 16, further comprising:
a bias input that receives a continuous bias signal;
a bias input delay element in communication with the bias input that applies a bias phase delay to the bias signal.

18. The neuron of claim 16, wherein the aggregator further comprises a summer that adds the plurality of input signals.

19. The neuron of claim 17, wherein the aggregator further comprises a summer that adds the plurality of input signals, and the bias signal.

20. The neuron of claim 15, wherein the actuator comprises:
a threshold detector configured to provide a detector output, the detector output indicating whether a sum of the plurality of input signals exceeds a threshold, and a multiplexer that selects, on the basis of the detector output, a continuous output signal from among a plurality of mutually phase-shifted continuous signals.

21. A method for processing data using an artificial neuron, the method comprising:
receiving, at the artificial neuron, a plurality of input signals, the value state of each of the input signals encoded in a phase thereof,
combining the plurality of input signals, and
providing a neuron output signal, the value state of the neuron output signal encoded in a phase thereof, the value state of the neuron output signal selected on the basis of the value states of the input signals.

22. The method of claim 21, wherein combining comprises applying a phase delay to at least one of the plurality of input signals.

23. The method of claim 22 further comprising:
receiving a continuous bias signal, and
applying a bias phase delay to the bias signal.

24. The method of claim 22, wherein combining further comprises adding the plurality of input signals together.

25. The method of claim 23, wherein combining further comprises adding together the plurality of input signals and the bias signal.

26. The method of claim 21, wherein providing comprises:
generating a threshold output indicating whether a sum of the input signals exceeds a threshold, and
selecting, on the basis of the threshold value, the neuron output signal from a plurality of mutually phase-shifted continuous signals.

27. The method of claim 21, wherein the value state of each of the input signals is a logical state, and wherein the value state of the neuron output signal is a logical state.

28. A system comprising a plurality of interconnected artificial neurons, each of the artificial neurons including:
an aggregator that combines a plurality of continuous input signals, the value state of each of the input signals being encoded in a phase thereof; and
an actuator in communication with the aggregator, the actuator configured to provide a continuous output signal, the value state of the output signal being encoded in a phase thereof, and being selected on the basis of the value states of the input signals.

29. The system of claim 28, wherein the aggregator comprises a plurality of delay elements, each of which applies a corresponding phase delay to one of the plurality of input signals.

30. The system of claim 29, further comprising:
a bias input that receives a continuous bias signal; and
a bias input delay element, in communication with the bias input, that applies a bias phase delay to the bias signal.

31. The system of claim 29, wherein the aggregator further comprises a summer that adds the plurality of input signals together.

32. The system of claim 30, wherein the aggregator further comprises a summer that adds together the plurality of input signals and the bias signal.

33. The system of claim 28, wherein the actuator comprises:
a threshold detector configured to provide a detector output, the detector output indicating whether a sum of the plurality of input signals exceeds a threshold, and
a multiplexer that selects, on the basis of the detector output, a continuous output signal from among a plurality of mutually phase-shifted continuous signals.

34. The system of claim 28, wherein the value state of each of the input signals represents a logical state, and wherein the value state of the output signal represents a logical state.

35. A method of manufacturing artificial neurons, the method comprises forming, for each artificial neuron:
a) an aggregator that combines a plurality of continuous input signals, the value state of each of the input signals being encoded in a phase thereof; and
b) an actuator in communication with the aggregator, the actuator configured to provide a continuous output signal, the value state of the output signal encoded in a phase thereof, the value state of the output signal being selected on the basis of the value states of the input signals.

36. The method of claim 35, wherein the aggregator comprises a plurality of delay elements, wherein each of plurality of delay elements applies a corresponding phase delay to one of the plurality of input signals.

37. The method of claim 36, wherein the artificial neuron further comprises a bias delay element that applies a bias phase delay to a continuous bias signal.

38. The method of claim 36, wherein the aggregator further comprises a summer that adds the plurality of input signals.

39. The method of claim 37, wherein the aggregator further comprises a summer that adds the plurality of input signals, and the bias signal.

40. The method of claim 35, wherein the actuator comprises:
a threshold detector configured to provide a detector output, the detector output indicating whether a sum of the plurality of input signals exceeds a threshold, and
a multiplexer that selects, on the basis of the detector output, a continuous output signal from among a plurality of mutually phase-shifted continuous signals.

41. The method of claim 35, wherein the value state of each of the input signals is a logical state, and wherein the value state of the output signal is a logical state.

* * * * *